United States Patent [19]

Louis et al.

[11] 4,364,723

[45] Dec. 21, 1982

[54] APPARATUS FOR TEXTURING A THERMOPLASTIC FILM

[75] Inventors: Paul R. Louis, Green Township, Hamilton County; Eugene R. Sorensen, Springfield Township, Hamilton County; Thomas R. Ballard, Sycamore Township, Hamilton County, all of Ohio

[73] Assignee: The Procter & Gamble Company, Cincinnati, Ohio

[21] Appl. No.: 179,907

[22] Filed: Aug. 20, 1980

Related U.S. Application Data

[62] Division of Ser. No. 36,254, May 4, 1979, Pat. No. 4,259,286.

[51] Int. Cl.³ .................. B29C 17/04; B29C 17/03
[52] U.S. Cl. ......................... 425/384; 425/324.1; 425/388; 425/403; 425/471
[58] Field of Search .................. 264/284, 280, 284; 425/290, 296, 304, 324.1, 325, 326.1, 383, 384, 385, 388, 436, 470, 291, 403, 405 R, 363, 471, DIG. 37, DIG. 119; 51/295

[56] References Cited

U.S. PATENT DOCUMENTS

| Re. 23,910 | 12/1954 | Smith | 264/555 |
|---|---|---|---|
| 2,567,275 | 9/1951 | Colombo | 264/284 |
| 2,776,452 | 1/1957 | Chavannes | 264/555 |
| 2,905,969 | 9/1959 | Gilbert et al. | 264/555 |
| 3,539,671 | 11/1970 | Nauta | 264/284 |
| 3,696,741 | 10/1972 | Reinke | 118/308 |
| 3,859,110 | 1/1975 | Foster et al. | 264/293 |
| 3,894,827 | 7/1975 | Raley et al. | 425/384 |
| 3,966,383 | 6/1976 | Bussey et al. | 264/555 |
| 4,099,934 | 7/1978 | Suzuki et al. | 51/295 |
| 4,151,240 | 4/1979 | Lucas et al. | 264/154 |
| 4,252,516 | 2/1981 | Raley et al. | 425/390 |

OTHER PUBLICATIONS

Gove et al., Webster's Third New Int'l. Dictionary (1963) Merriam, Springfield Mass., p. 64.

Primary Examiner—Willard E. Hoag
Attorney, Agent, or Firm—John M. Pollaro; Fredrick H. Braun; Richard C. Witte

[57] ABSTRACT

Apparatus for texturing a running ribbon of thermoplastic sheet material or film. The apparatus causes a ribbon of such film to be forwarded from a supply such as a roll of thermoplastic material, thence about a circumferentially extending portion of a rotating texturing cylinder, and then downstream where the textured film may be further processed or where it may be wound on a spool to form a roll thereof. The texturing cylinder comprises a tubular member having a coating of spheroidal particles adhered to the surface thereof. While the film is in contact with the texturing cylinder, it is both heated and urged against the texturing cylinder, causing the film to assume the textured image of the texturing cylinder. The apparatus may further control tension in the film both upstream and downstream of the texturing cylinder at predetermined constant levels. A method of making the texturing cylinder is also disclosed in which an epoxy film having spheroidal particles dispersed therein is electrostatically coated onto the radially outwardly facing surface of the texturing cylinder.

4 Claims, 10 Drawing Figures

APPARATUS FOR TEXTURING A THERMOPLASTIC FILM

This is a division of application Ser. No. 036,254 filed May 4, 1979, now U.S. Pat. No. 4,259,286.

BACKGROUND OF THE INVENTION

Apparatus comprising various means for unwinding, forwarding, texturing, or otherwise imparting a surface pattern to a thermoplastic film and rewinding of the ribbon or web of thermoplastic film are disclosed in the prior art: see for instance, U.S. Pat. No. Re. 23,910—Method Of And Apparatus for Producing Textured Films which issued Dec. 14, 1954 to L. H. Smith et al.; U.S. Pat. No. 3,054,148—Process Of Producing A Perforated Thermoplastic Sheet which issued Sept. 18, 1962 to W. F. Zimmerli; and U.S. Pat. No. 2,567,275—Apparatus And Method Of Goffering Thermoplastic Materials which issued Sept. 11, 1951 to R. Colombo. See also the German Offenlegungsschrift No. 2,409,497 published Nov. 11, 1975 which teaches the use of radially inwardly impinging hot air jets in combination with vacuum inside a cylinder having a perforated surface to cause a thermoplastic sheet passing therebetween to become perforated. Also, reference U.S. Pat. No. 3,674,221—Dynamic Stress-Strain Testing Of Ribbons Of Film which issued July 4, 1972 to Coenraad E. Riemersma.

The prior art also discloses various methods of making perforated members: see for instance U.S. Pat. No. 3,453,712—Method of Making A Porous Roll which issued July 8, 1969 to R. G. MacKendrick; U.S. Pat. No. 3,613,208—Method of Fabricating A Perforated Panel For A Vacuum Work-Holder Or Chuck which issued Oct. 19, 1971 to H. A. Seberg et al; U.S. Pat. No. 3,247,579—Circuit Fabrication Method which issued Apr. 26, 1966 to L. H. Cattermole et al; and U.S. Pat. No. 4,151,240—Method Of And Apparatus For Debossing & Perforating a Running Ribbon Of Thermoplastic Film which issued to Lucas et al. on Apr. 24, 1979.

The prior art does not disclose, however, solutions to all of the problems associated with providing a method of and apparatus for texturing a web of thermoplastic material.

OBJECTS OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the present invention is to provide an apparatus for texturing thermoplastic sheet material.

Another object of the present invention is to provide the apparatus described in the preceding paragraph wherein a continuous ribbon of thermoplastic material having a nominal thickness (e.g., from about 0.0005 to about 0.005 inches) is textured to provide an undulating surface having an improved tactile impression and reduced reflectivity.

SUMMARY OF THE INVENTION

The above recited and other objects of the invention are achieved by providing a method of and apparatus for texturing a running ribbon of thermoplastic film.

The method of the present invention to texture a running ribbon of smooth thermoplastic film comprises the steps of: establishing and maintaining control of the running film by establishing and maintaining constant tension therein; isolating a portion of the film from the constant tension while it is in contacting relation with a textured surface; heating the tension isolated portion of the film to raise its temperature above its thermoplastic temperature; urging the heated, tension isolated portion of the film against the textured surface to cause the film to be textured in the image of the textured surface; and, cooling the textured film to lower its temperature to below the thermoplastic temperature of the film before subjecting the film to downstream tension.

The apparatus embodiment of the present invention comprises a texturing cylinder having a perforated tubular-shaped wall and having a radially outwardly facing surface. The apparatus further comprises a frame, means for rotating the texturing cylinder at a controlled rate on its axis of gyration, means for smoothing and forwarding the running ribbon of film under predetermined tension onto the radially outwardly facing surface of the tubular wall at a first fixed position with respect to the frame, means for leading the textured film from the cylinder at a second fixed position with respect to the frame which is circumferentially spaced from the first fixed position, means intermediate the first and second fixed positions for urging the film against the texturing cylinder and for heating the film to a sufficiently high temperature to cause the film to assume the image of the textured surface of the cylinder, means for cooling the film to a temperature below its thermoplastic temperature while maintaining virtually zero tension therein, and means for thence forwarding the film from the texturing cylinder under a predetermined level of tension.

The texturing cylinder has a radially outwardly facing surface which is textured. The texture is obtained by coating the surface of the cylinder with an epoxy having spheroidal particles dispersed therein. The degree of texture may be varied by changing the size and/or number of particles dispersed within the epoxy.

BRIEF DESCRIPTION OF THE DRAWINGS

While the specification concludes with claims particularly pointing out and distinctly claiming the subject matter regarded as the present invention, it is believed the invention will be better understood from the following description taken in connection with the accompanying drawings in which:

DESCRIPTION OF THE PREFERRED EMBODIMENT

Figure 1:
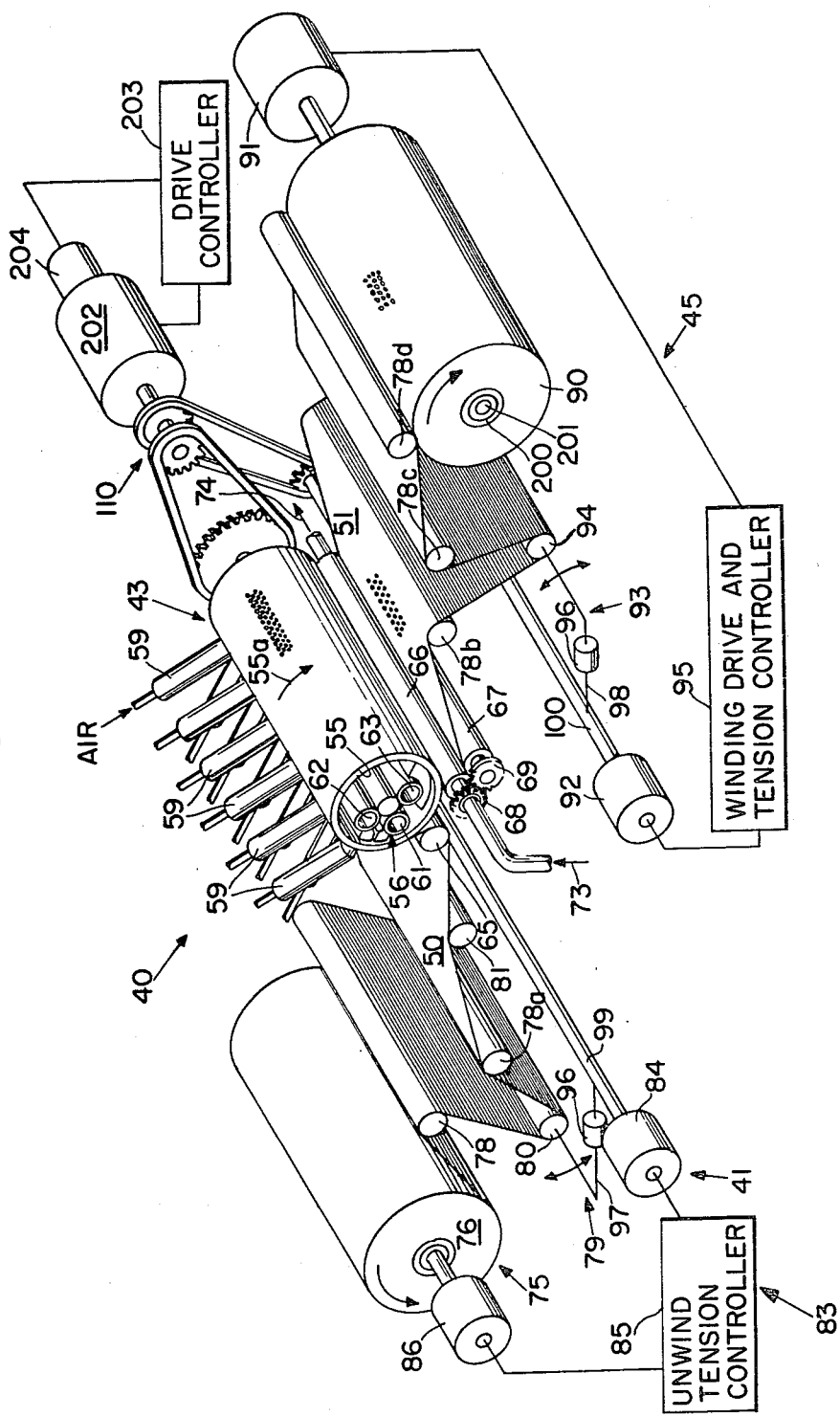
FIG. 1 is a perspective schematic view of an apparatus embodying the present invention.

Referring now to the drawings, there is shown a preferred embodiment of the present invention as it would be used to emboss/deboss and perforate, as well as texture, a running ribbon of thermoplastic material. As used herein, the term "texture" refers to the visual and tactile surface features of the thermoplastic material which are characterized by the presence of a multiplicity of nubbles. Nubbles are small protuberances projecting outward from one suface of the thermoplastic material. Nubbles differ from embossments/debossments in that nubbles are dimensionally smaller and basically imparts a change in tactile impression and light reflectivity of the thermoplastic materials without substantially altering the macroscopic profile of the film of thermoplastic material. It will be understood that the thermoplastic material may be textured (i.e., a multiplicity of nubbles imparted to the surface thereof) with or without being embossed/debossed and/or perforated.

As shown in FIG. 1, a preferred embodiment of the present invention, apparatus 40, includes constant tension film supply means 41, texturing means 43, and constant tension film forwarding and winding means 45. The frame, bearings, supports and the like which must necessarily be provided with respect to the functional members of apparatus 40 are not shown in the figures or described in detail in order to simplify and more clearly depict and disclose the present invention, it being understood that such details would be obvious to persons of ordinary skill in the art of designing thermoplastic film converting machinery. Further, except for the texturing means 43, apparatus 40 is substantially identical to the apparatus disclosed in U.S. Pat. No. 4,151,240 entitled Method of and Apparatus for Debossing and Perforating a Running Ribbon of Thermoplastic Film, which was issued to M. B. Lucas et al on Apr. 24, 1979 which patent is incorporated herein by reference.

Briefly, apparatus 40, FIG. 1, comprises means for continuously converting a ribbon of thermoplastic film 50 into a textured film 51 by directing hot air jets against one surface of the film while applying vacuum adjacent the opposite surface of the film, and while maintaining sufficient control of the film 50 to substantially obviate wrinkling and/or macroscopically distending the film. Thus, as will be more fully described hereinafter, apparatus 40 comprises means for maintaining constant machine direction tension in the film both upstream and downstream of a zone while the temperature of the film is greater than the thermoplastic temperature of the film but in which zone there is substantially zero machine-direction and transverse-machine-direction tension tending to macroscopically distend the film. The tension is required to control and smooth a running ribbon of thermoplastic film; the zero tension zone results from the film in the zone being at a sufficiently high temperature to enable texturing it through the use of heat and vacuum. FIG. 1 also shows greatly enlarged scale nubbles in film 51 to enable visually perceiving the nature of the difference between the smooth film 50 and the textured film 51 as more fully described hereinafter. As used herein, the term "running ribbon" refers to film of thermoplastic material having a length very much larger than its width which moves through apparatus 40 as described hereinafter.

Figure 2:
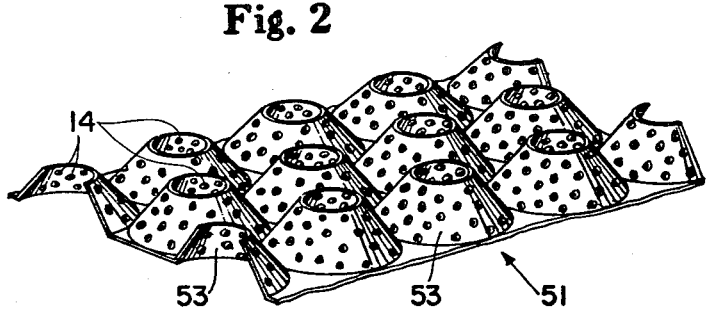
FIGS. 2 and 3 are perspective fragmentary views of the bottom side (machine side) and the top side respectively of a textured, debossed and perforated thermoplastic film.
Figure 3:
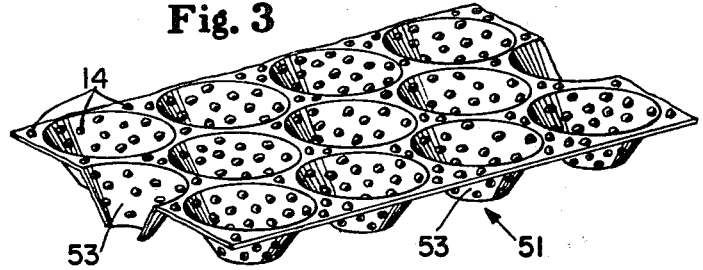

FIGS. 2 and 3 are perspective views of fragmentary portions of textured, embossed/debossed and perforated film 51 of a thermoplastic material such as polyethylene which has been converted from a smooth film through the use of apparatus 40, FIG. 1. Such a textured, debossed/embossed and perforated film may be used, for example, as a topsheet in an absorptive structure having tapered capillaries 53. Such structures, including disposable diapers, incontinent pads, bandages, and the like, are disclosed in U.S. Pat. No. 3,929,135 which was issued Dec. 30, 1975 to Hugh Ansley Thompson, and which is hereby incorporated by reference.

While FIGS. 2 and 3 are not drawn to scale the difference between nubbles 14 and debossments/embossments in the form of tapered capillaries 53 can be seen. Tapered capillaries 53 substantially change the macroscopic profile of smooth film 50 compared to nubbles 14 which do not substantially alter the macroscopic profile.

Figure 4:
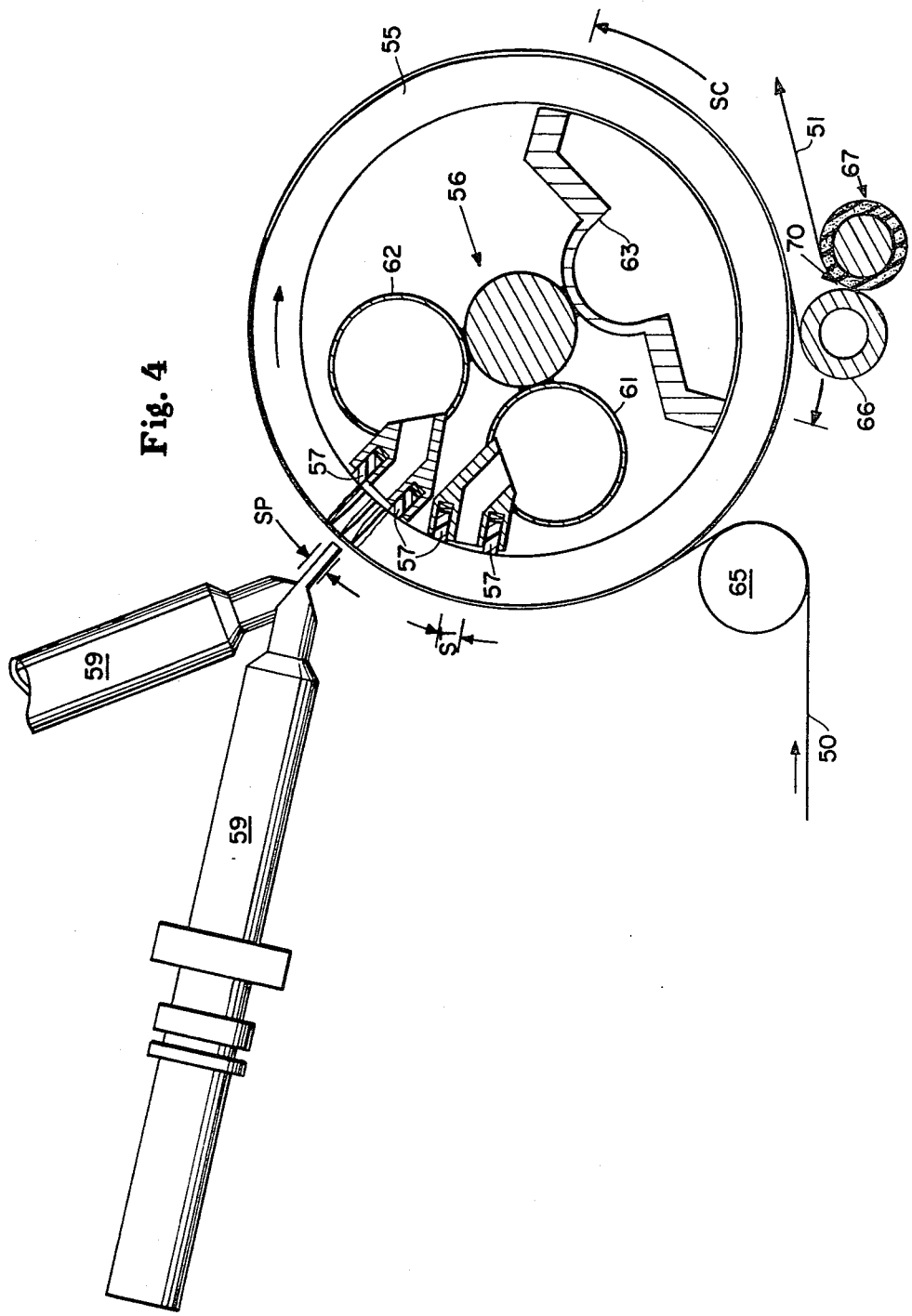
FIG. 4 is a fragmentary, enlarged scale, side elevational view of the texturing cylinder portion of the apparatus shown in FIG. 1.

FIG. 4 is an enlarged scale end view of the texturing means 43, FIG. 1, which in the preferred embodiment includes a rotatably mounted texturing cylinder 55, a nonrotating triplex vacuum manifold assembly 56 including seals 57, and hot air jet heaters 59. The triplex vacuum manifold assembly 56 comprises three manifolds designated 61, 62, and 63. FIG. 4 also shows a freely rotatably mounted lead-on idler roll 65, a power rotated lead-off/chill roll 66, and a soft-face (e.g., low density neoprene) roll 67 which is gear driven by the chill roll through gears 68, 69, FIG. 1. Briefly, by providing means (not shown) for independently controlling the degree of vacuum in the three vacuum manifolds 61, 62, and 63, a thermoplastic ribbon of film running circumferentially about a portion of the texturing cylinder 55 is sequentially subjected to a first level of vacuum in a first sector ST, FIG. 4, a second level of vacuum in a second sector SP, and a third level of vacuum in a third sector SC. As will be described more fully hereinafter, the vacuum applied to the film 50 in sector ST enables maintaining upstream tension in the film 50, vacuum in sector SP urges the film 50 against the texturing cylinder 55 and enables texturing, embossing/debossing and perforating the film 50 when hot air is directed radially inwardly against the film 50, and vacuum in sector SC enables cooling the film 51 to below its thermoplastic temperature and enables establishing downstream tension therein. The nip 70 intermediate chill roll 66 and the soft-face roll 67 is only nominally loaded because high pressure would iron-out the embossments/debossments which are alternatively designated tapered capillaries 53, FIGS. 2 and 3. However, even nominal pressure in nip 70 helps the vacuum in sector SC to isolate downstream tension (e.g.: roll winding tension) from the texturing sector SP of the texturing cylinder 55, and enables the nip 70 to peel the film from the texturing cylinder 55. Moreover, while vacuum drawn ambient air passing through the film in sector SC will normally cool the film to below its thermoplastic temperature, the passage of coolant through the chill roll as indicated by arrows 73, 74 in FIG. 1 will enable the apparatus to handle, for instance, thicker films, or be operated, for instance, at higher speeds.

Referring back to FIG. 1, the constant tension film supply means 41 and the constant tension film forwarding and winding means 45 are substantially identical to and function substantially identically to the corresponding portions of the apparatus shown and described in U.S. Pat. No. 3,674,221 which was referenced hereinbefore and which is hereby incorporated by reference.

Briefly, however, the constant tension film supply means 41 comprises means 75 for rotatably mounting a roll 76 of thermoplastic film, a first idler roll 78, a dancer assembly 79 having a swingably mounted, freely rotatable dancer roll 80, a second idler roll 78A, a Mount Hope Vari-Bow (Registered Trademark of Mount Hope Machinery Company, Taunton, Massachusetts 02780) smoothing roll 81, the film-lead-on idler roll 65, and feedback film tension control means 83 comprising a dancer elevation position sensor 84, an unwind tension controller 85, and a variable-torque unwind brake 86. When the film 50 is looped from the roll 76 to the texturing cylinder 55 as shown in FIG. 1, the film 50 is urged against and adhered to the first sector ST, FIG. 4, of the texturing cylinder 55 by vacuum applied through manifold 61. Thus, the film 50 is pulled as the texturing cylinder 55 rotates clockwise as indicated by the arrow 55A, while the tension control loop causes the unwind brake 86 to sufficiently resist unwinding the roll 76 of film 50 to establish and maintain a constant predetermined level of tension in the film in the machine direction. This, in turn, enables the film 50 to be tensioned transversely as it is drawn over the Mount Hoper Vari-Bow roll 81 whereby it is smoothed; i.e., made wrinkle free by having a transverse tension developed in the film as it runs over the arcuate-shape roll 81.

The tension in the film is reduced to zero, and in the preferred embodiment, the film is textured, embossed/debossed and perforated as it passes over the second sector SP, FIG. 4, of the rotating texturing cylinder 55 where vacuum applied to manifold 62 urges film 50 against the texturing cylinder 55. Then, the film is urged against and adhered to the third sector SC of the texturing cylinder 55 by vacuum applied to manifold 63 to enable the constant tension film forwarding and winding means 45 to again establish and maintain sufficient uniform tension in the film 51 to forward the film downstream under sufficient control to, for instance, wind the film to form a roll 90 of textured, embossed/debossed and perforated film. In this event, the torque of the winding drive motor 91 is controlled by the dancer-roll-position-responsive sensor 92 connected via trapeze 93 to dancer roll 94 through the winding drive and tension controller 94 to establish and maintain a substantially constant predetermined level of machine direction tension in film 51. To summarize, the first and third vacuum sectors, ST and SC respectively, of the texturing cylinder 55 enable maintaining substantially constant upstream and downstream tension, respectively, in a running ribbon of film while the intermediate portion of the film adjacent the second vacuum sector SP of the texturing cylinder 55 is subjected to tension vitiating heat and vacuum to effect texturing, embossing/debossing and perforating the film.

Weights 96, FIG. 1, on the dancer trapeze arms, 97 and 98, enable independently adjusting the upstream and downstream levels of tension: higher tensions by placing the weights 96 further from the dancer shafts 99, 100; and lower tensions by moving the weights 96 towards the dancer shafts 99, 100.

Referring again to FIG. 1, the texturing means 43 comprises the rotatably mounted texturing cylinder 55, means 110 for rotating the texturing cylinder 55 at a controlled peripheral velocity, the non-rotating triplex vacuum manifold assembly 56 inside the texturing cylinder 55 for urging the film 50 against the texturing cylinder 55, means (not shown) for applying controlled levels of vacuum inside the three vacuum manifolds 61, 62, and 63 comprising the triplex manifold assembly 56, and a plurality of air heaters 59.

Figure 5:
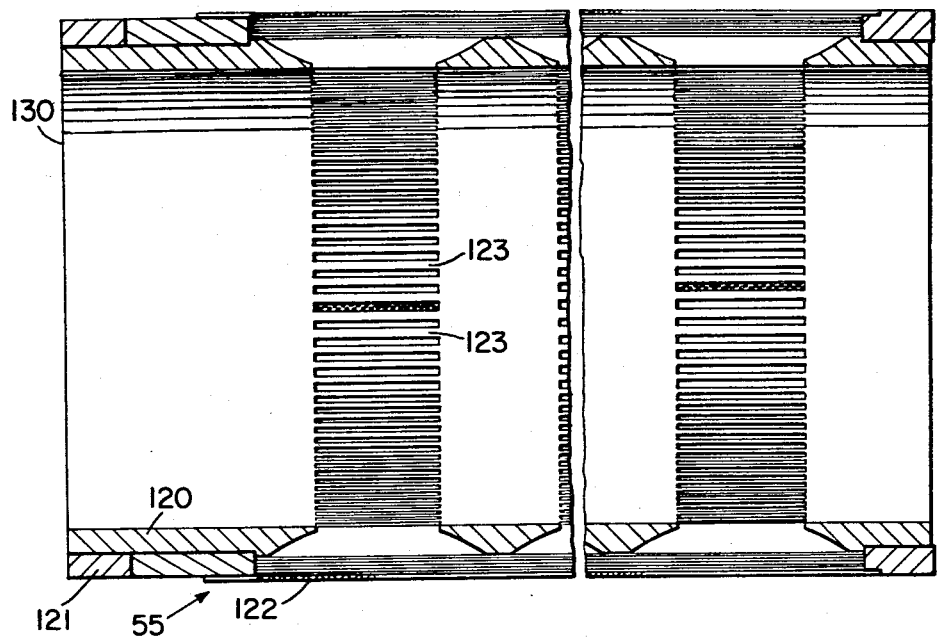
FIG. 5 is an enlarged scale, longitudinal sectional view of the texturing cylinder of the apparatus shown in FIG. 1.
Figure 6:
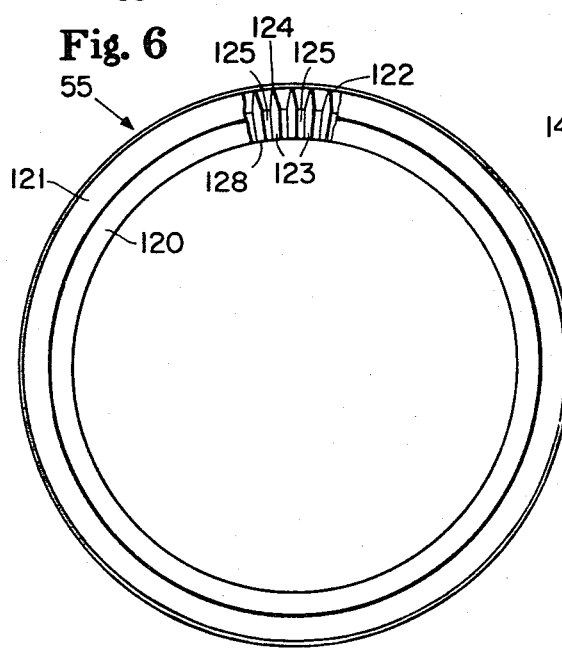
FIG. 6 is an end view of the texturing cylinder shown in FIG. 5.

The texturing cylinder 55, FIGS. 5 and 6, comprises a cage 120, a support ring 121 and a thin wall perforated tubular member 122. The cage 120 comprises a multiplicity of circumferentially spaced, longitudinally extending bars 123 which are tapered to relatively small, radially outwardly facing lands 124, and the spaced bars 123 have vacuum communicating passageways 125 provided therebetween. The bars 123 also have radially inwardly facing lands 128 which cooperately provide a cylindrical vacuum sealing surface against which the vacuum seals 57, FIG. 4, are biased. Thus, as the texturing cylinder 55 rotates, FIG. 4, its vacuum sealing surface slides over the seals 57 of the nonrotating triplex vacuum manifold assembly 56.

The end 130, FIG. 5, of the texturing cylinder 55 disposed remotely from its driven end is preferably open in order to provide easy insertion/removal of the triplex vacuum manifold assembly 56. Therefore, in order to rotatably support the open end 130 of the texturing cylinder 55, it is provided with a bearing-race support ring 121, FIG. 5, which rides on bearings, now shown, which are appropriately secured to the apparatus frame, not shown.

Figure 7:
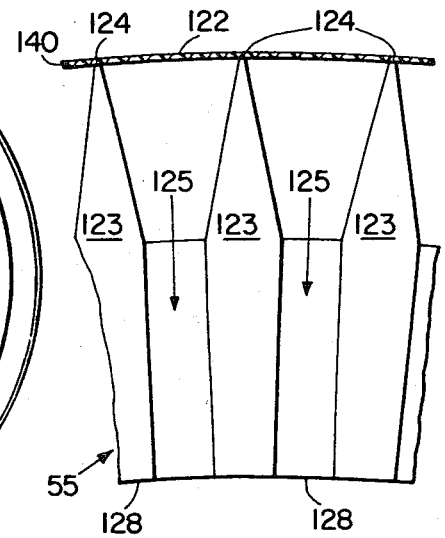
FIG. 7 is a greatly enlarged scale, fragmentary portion of the end view of the texturing cylinder shown in FIG. 5.

FIG. 7 shows the perforated tubular member 122 to comprise a thin wall 140 in contacting relation with the small lands 124 of the cage 120. The lands 124 are small and the tubular member 122 is thin-walled because the preferred embodiment apparatus 40, FIG. 1, is configured to texture, emboss/deboss and perforate a relatively thin thermoplastic film such as low density polyethylene film, thereby providing small tapered capillaries 53 as well as nubbles 14, FIGS. 2 and 3.

Figure 8:
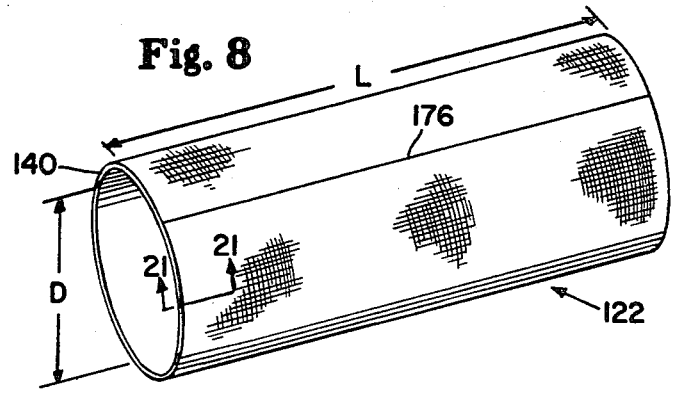
FIG. 8 is a perspective view of the perforated tubular member of the texturing cylinder shown in FIGS. 5 through 7, inclusive.

FIG. 8 is a perspective view of the perforated tubular member 122 of the texturing cylinder 55 having a diameter D and length L. In the preferred embodiment, apparatus, D is 8.914 inches (22.64 centimeters) and L is 21.50 inches (54.61 centimeters). Also, the member has a longitudinally extending seam, 176.

Figure 10:
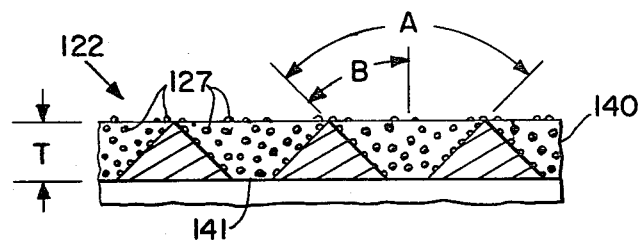
FIG. 10 is an enlarged scale, fragmentary sectional view taken along line 10—10 of FIG. 9.
Figure 9:
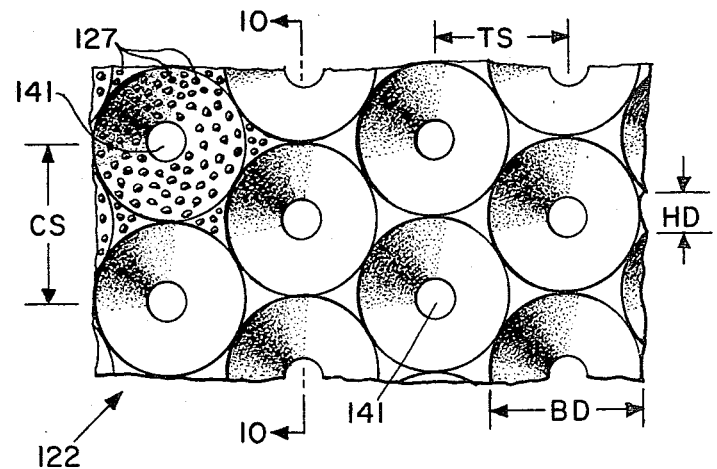
FIG. 9 is an enlarged scale, fragmentary view of the radially outwardly facing surface of the perforated tubular member shown in FIG. 8.

FIG. 9 is a radially inwardly facing, enlarged scale view of a fragmentary portion of the perforated tubular member 122. FIG. 10 is a further enlarged scale sectional view taken along line 10—10 of FIG. 9. Thus, the perforated tubular member 122 of the perferred embodiment apparatus 40 comprises a thin wall 140 having a thickness T (from about 0.013 inches to about 0.014 inches), and having a closely packed array of tapered holes 141 therethrough. The holes 141, FIG. 9, are circumferentially spaced (CS) 0.040 inches (0.102 centimeters) center-to-center, transversely spaced (TS) 0.0346 inches (0.088 centimeters) center-to-center, have base diameters (BD) of 0.040 inches (0.102 centimeters), and hole diameters (HD) of 0.013-0.14 inches (0.0330 to 0.0356 centimeters). The holes 141, FIG. 10, have included angles A of 90 degrees, and included half angles B of 45 degrees. Thus, the perforated tubular member 122 of the preferred embodiment apparatus 40 has approximately four-hundred-thirty-five-thousand (435,000) holes 141 in it.

Still referring to FIGS. 9 and 10, it can be seen that particles 127 are affixed to tubular member 122 in any suitable manner. In a preferred method, tubular member 122 is cleaned thoroughly such as by using methyl ethyl ketone of vapor degreasing techniques in order to totally expose the base metal of tubular member 122. The cleaned tubular member 122 is coated with a mixture of particles 127 and epoxy which may be electrostatically sprayed onto tubular member 122 using any suitable spraying system such as is manufactured by Metokote Equipment Company of Lima, Ohio and marketed under the tradename Meco 10. Aluminum Oxide particles were used and found to be satisfactory. After spraying the mixture of aluminum oxide particles 127 and epoxy onto tubular member 122, the epoxy is cured.

By varying the ratio of the particles 127 to epoxy, the texture of the film 51 is varied. Similarly, varying the size of the particles 127 will also vary the texture of the film 51. Table I sets forth some of the aluminum oxide particles sizes and ratios of aluminum oxide particles to epoxy which were used and found to be satisfactory.

TABLE I

| Particle Diameter (inches) | 0.0025 | 0.00225 | 0.00195 | 0.0016 |
|---|---|---|---|---|
| Ratio of Particles to epoxy by wt. | 2.3:1 | 3:2 | 3:2 | 1.1:1 |

An acceptable epoxy is manufactured by Armstrong Products Company of Warsaw, Ind. and marketed under the tradename Armstrong Vibro-Flo E-7000 Series. Suitable aluminum oxide particles 127 are manufactured by General Abrasives Company of Niagara Falls, N.Y. and are marketed under the tradename Lionblast. The particles 127 used should be sorted by size which may be conveniently done by passing the particles 127 through a series of U.S. standard sieves such as those manufactured by W. S. Tyler Company of Cleveland, Ohio. Those particles 127 which were found to work well had a diameter of from about 0.0015 to about 0.0030 inches (about 0.038 to about 0.076 mm.) and were found to produce satisfactory nubbles 14 in the thermoplastic film 51.

Heaters 59 of the preferred apparatus, FIGS. 1 and 4, are Model No. 33-HS which are available from Kamweld Products Company, Inc., 90 Access Road, P.O. Box 91, Norwood, Mass. 02062. When operated on 120 volts, they provide 900 watts of heat and cause a flow of 6-8 cfm to be heated approximately 243 degrees centigrade; substantially higher than the thermoplastic temperature of low density polyethylene.

Method of Texturing, Embossing/Debossing and Perforating a Running Ribbon of Thermoplastic Film In view of the foregoing description of the preferred apparatus embodiment of the present invention, the method need not be described exhaustively. Suffice it to say, the preferred method of the present invention to continuously texture, emboss/deboss and perforate a running ribbon of smooth thermoplastic film comprises the steps of: establishing and maintaining control of the running film by establishing and maintaining constant tension therein; isolating a portion of the film from the constant tension while it is urged into contacting relation with a texture imparting surface; heating the tension isolated portion of the film to raise its temperature to above its thermoplastic temperature; urging heated, tension isolated portion of the film against the texture forming surface to cause the film to be textured in the image of the texture forming surface; and, cooling the textured film to lower its temperature to below the thermoplastic temperature of the film before subjecting the film to downstream tension.

Operation of the Preferred Embodiment

To operate apparatus 40, the film 50 is looped, as shown in FIG. 1, from roll 76, over idler roll 78, under dancer roll 80, over idler roll 78A, over the Mount Hope Vari-Bow roll 81, under the lead-on idler 65, clockwise about the texturing cylinder 55, under the lead-off/chill roll 66, through the nip 70 intermediate the lead-off/chill roll 66 and the soft-face roll 67, over idler roll 78B, under dancer roll 94, over idler roll 78C, and thence onto a spool 200 on the roll winding shaft 201. The idler roll 78D is mounted so that it is gravitationally loaded against the top portion of the roll 90 being wound. The unwind tension control loop and the winding tension control loop are activated. The drive motor 202 is then operated by the drive controller 203 in response to operator inputs and in response to the feedback tachometer 204 to rotate the texturing cylinder 55 at a predetermined peripheral speed, and the chill roll 66 at a slightly higher (slack obviating) peripheral speed. The tension control loops respond to establish and maintain their respective predetermined levels of tension (as determined by the positions of weights 96) substantially irrespective of the film velocity.

Air is then directed through heaters 59, FIG. 1, and electrical power is applied thereto whereby jets of hot air issue from the heaters 59 to form a virtual curtain of hot air directed radially inwardly toward sector SP, FIG. 4, of the texturing cylinder 55. With sufficient levels of vacuum applied to sectors ST and SC to isolate sector SP from upstream and downstream tension, vacuum applied to sector SP acts in concert with the hot air jets to texture, emboss/deboss and perforate the film.

When the preferred apparatus is used to texture, emboss/deboss and perforate low density polyethylene having a thickness of about 0.001 inches at 50 feet per minute, the upstream tension is adjusted to about 8 ounces per lineal inch, the downstream tension is adjusted to about 2 ounces per lineal inch, and the levels of vacuum applied to sectors ST, SP, and SC are 5, 15, and 5 inches of mercury, respectively.

While the preferred embodiment apparatus has been shown and described as comprising unwinding and winding means, these limitations are not believed to be critical to the present invention. Indeed, while these and other aspects of the present invention have been illustrated and described, it will be obvious to those skilled in the art that various changes and modifications can be made without departing from the spirit and scope of the present invention, and it is intended to cover in the appended claims all such changes that are within the scope of the invention. For example, various means for urging the film 50 against the texturing cylinder 55 other than that specifically described will present themselves to one of ordinary skill in the art. Further, tubular member 122 may be configured so as to preclude embossing/debossing and perforating the film 50 in which case the film 50 will be textured only.

What we claim is:

1. An apparatus for texturing a running ribbon of thermoplastic film material comprising:

a frame;

a texturing means for imparting a multiplicity of nubbles to said thermoplastic film material said texturing means comprising a texturing cylinder having a radially outwardly surface, said surface having a closely packed array of tapered holes, and having a multiplicity of particles adhered to said radially outwardly surface and to the walls of said tapered holes;

first means for forwarding a smooth, running ribbon of thermoplastic film into contact with said texturing means;

second means for forwarding said running ribbon of thermoplastic film from said texturing means;

tension maintaining means for maintaining substantially constant predetermined levels of tension in said film being forwarded into contact with and from said texturing means;

isolating means for sufficiently isolating a portion of said film while said isolated portion is in contact with said texturing means from said levels of tension so that said portion of film can be heated to above its thermoplastic temperature without being macroscopically distended;

heating means for heating said portion of said film to a temperature above the thermoplastic temperature of said film;

urging means for urging said portion of said film against said texturing means with a pressure sufficient to impart a multiplicity of nubbles to said film;

cooling means for sufficiently cooling said portion of said film before said film is forwarded from said texturing means to cause the nubbles to be set in said film, and to enable said predetermined level of tension to be applied to said film being forwarded from said texturing means without causing said film to be substantially distended in the machine direction.

2. The apparatus of claim 1 wherein said urging means comprises a vacuum means for applying a vacuum to said texturing cylinder so as to hold said isolated portion of said thermoplastic film in contact with said texturing cylinder.

3. The apparatus of claim 1 wherein said particles are aluminum oxide.

4. The apparatus of claim 1 or claim 3 wherein said particles have a diameter of from about 0.0015 inches to about 0.0030 inches.

* * * * *

UNITED STATES PATENT AND TRADEMARK OFFICE
CERTIFICATE OF CORRECTION

PATENT NO. : 4,364,723
DATED : December 21, 1982
INVENTOR(S) : Paul R. Louis, Eugene R. Sorensen, Thomas R. Ballard It is certified that error appears in the above-identified patent and that said Letters Patent are hereby corrected as shown below:

Column 1, line 23, "2,409,497" should read --2,409,496--.

Column 3, line 25, "suface" should read --surface--.

Column 5, line 58, "94" should read --95--.

Signed and Sealed this

Twenty-eighth Day of June 1983

[SEAL]

Attest:

GERALD J. MOSSINGHOFF

Attesting Officer

Commissioner of Patents and Trademarks